(12) United States Patent
Kuprin et al.

(10) Patent No.: US 11,099,332 B1
(45) Date of Patent: Aug. 24, 2021

(54) RETROFIT OPTICAL FIBER CONNECTOR MODULE

(71) Applicant: Molex, LLC, Lisle, IL (US)

(72) Inventors: Igor Kuprin, Lisle, IL (US); Wenzong Chen, Lisle, IL (US); Thomas D Schiltz, Lisle, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/798,425

(22) Filed: Feb. 23, 2020

(51) Int. Cl.
*G02B 6/38* (2006.01)

(52) U.S. Cl.
CPC ........ *G02B 6/3885* (2013.01); *G02B 6/3821* (2013.01); *G02B 6/3826* (2013.01); *G02B 6/3887* (2013.01)

(58) Field of Classification Search
None
See application file for complete search history.

(56) References Cited

U.S. PATENT DOCUMENTS

| 2001/0041030 | A1* | 11/2001 | Chen | G02B 6/3897 385/88 |
| 2003/0223703 | A1* | 12/2003 | Chen | G02B 6/3849 385/78 |
| 2004/0117981 | A1* | 6/2004 | Roth | G02B 6/3869 29/828 |
| 2004/0120656 | A1* | 6/2004 | Banas | G02B 6/4478 385/86 |
| 2019/0384017 | A1* | 12/2019 | Lu | G02B 6/3893 |
| 2020/0166711 | A1* | 5/2020 | Hu | G02B 6/406 |

* cited by examiner

*Primary Examiner* — Michael Stahl

(57) ABSTRACT

An optical fiber connector module for coupling to a ferrule terminated to at least one fiber in a ribbon cable is provided. The optical fiber connector module may include a first connector body member for coupling to the ferrule, the first connector body member including at least one alignment component coupling section, at least one biasing component coupling section, and a first through-channel for the ribbon cable. The optical fiber connector module may include a second connector body member coupled to the first connector body member, the second connector body member including at least one biasing component coupling section, a second through-channel for the ribbon cable, and an open side spanning the length of the second connector body member providing access to the second through-channel for the ribbon cable.

8 Claims, 12 Drawing Sheets

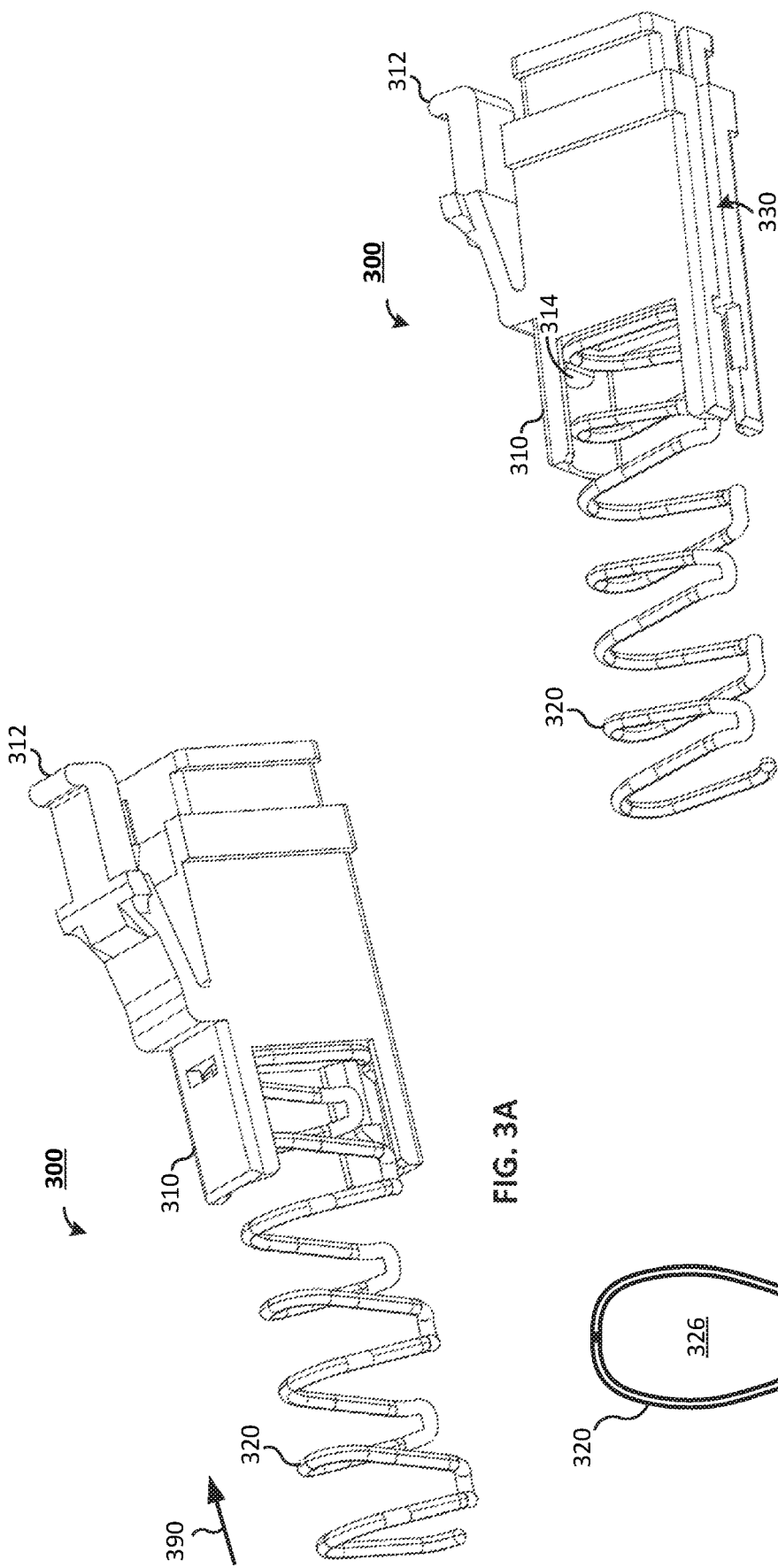

RETROFIT OPTICAL FIBER CONNECTOR MODULE

BACKGROUND

Technical Field

The present disclosure relates to the field of optical fiber connector assemblies, and more particularly, but not exclusively, to connector assemblies including terminated ferrules.

Background

Systems for interconnecting optical fibers or optical waveguides typically utilize a mating optical fiber interconnect assembly to facilitate the handling and accurate positioning of optical fibers. Individual optical fibers may be secured within a ferrule of the interconnect assembly with pairs of the optical fiber interconnect assemblies mated in an adapter to center the fibers for providing low insertion losses. The adapter couples the connectors together so that their encapsulated fibers connect end-to-end.

Various problems continue to be encountered in designing optical fiber connector assemblies or other connector assemblies. Such problems include the process for manufacturing and putting the optical fiber connector assemblies together. For example, due to the number of components involved, the process may be difficult and expensive, with any mistakes and damage to components during assembly magnifying the expense.

The present disclosure is directed to solving these problems and to provide various improvements in the connector assemblies and the process for putting them together.

SUMMARY

In an aspect of the disclosure, an optical fiber connector module for coupling to a ferrule terminated to at least one fiber in a ribbon cable is provided. The optical fiber connector module may include a first connector body member for coupling to the ferrule, the first connector body member including at least one alignment component coupling section, at least one biasing component coupling section, and a first through-channel for the ribbon cable. The optical fiber connector module may include a second connector body member coupled to the first connector body member, the second connector body member including at least one biasing component coupling section, a second through-channel for the ribbon cable, and an open side spanning the length of the second connector body member providing access to the second through-channel for the ribbon cable.

In another aspect of the disclosure, an optical fiber connector module for coupling to a ferrule terminated to at least one fiber in a ribbon cable is provided. The optical fiber connector module may include a biasing component having a structure with an open side for side insertion of the ribbon cable. The optical fiber connector module may include a first connector body member for coupling to the ferrule, the first connector body member including at least one alignment component coupling section, a biasing component coupling section, and a first through-channel for the ribbon cable. The optical fiber connector module may include a second connector body member coupled to the first connector body member, the second connector body member including a biasing component coupling section, a second through-channel for the ribbon cable, and a second open side spanning the length of the second connector body member providing access to the second through-channel for the ribbon cable.

In another aspect of the disclosure, a method is provided for assembling an optical fiber connector module that couples to a ferrule terminated to at least one fiber in a ribbon cable, with the method being performed in any operative order. The method may include coupling, using at least one biasing component, a first connector body member to a second connector body member. The method may include latching the first connector body member to the second connector body member. The method may include passing the ribbon cable of the ferrule through an open side of the second connector body member. The method may include coupling, using at least one alignment component, the first connector body member to the ferrule.

In another aspect of the disclosure, a method is provided for assembling an optical fiber connector module that couples to a ferrule terminated to at least one fiber in a ribbon cable, with the method being performed in any operative order. The method may include coupling, using a biasing component, a first connector body member to a second connector body member. The method may include passing the ribbon cable of the ferrule through an open side of the second connector body member into a through-channel of the second connector body member. The method may include passing the ribbon cable of the ferrule through an open side of the biasing component into the interior of the biasing component. The method may include coupling, using at least one alignment component, the first connector body member to the ferrule.

BRIEF DESCRIPTION OF THE DRAWINGS

FIGS. 3A-B are perspective views of another exemplary connector module including a body member and spring.

FIG. 3C is diagram illustrating a front view of the spring of FIG. 3A.

DETAILED DESCRIPTION OF THE PREFERRED EMBODIMENTS

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. It will, however, be apparent to those skilled in the art that these concepts may be practiced without these specific details. In some instances, well known structures and components are shown in block diagram form in order to avoid obscuring such concepts.

Several aspects of the connector modules will now be presented with reference to various apparatuses and methods. These apparatuses and methods will be described in the following detailed description and illustrated in the accompanying drawings by various blocks, modules, components, steps, processes, etc. (collectively referred to as "elements"). While the methods may be described in an ordered series of steps, it will be apparent to those skilled in the art that the methods may be practiced in any operative order and each step may be practiced in various forms that are apparent to those skilled in the art.

Disclosed herein are optical fiber connector modules and methods for assembling the optical fiber connector modules. Optical fiber connector modules are used within optical communication systems and provide an important connection point by aligning and coupling segments of optical fiber cables (e.g., with the connector modules latched at different ends of a housing) so that signals may be transmitted between the segments. In the various embodiments, the connector modules may be mechanical transfer (MT) connectors. The connector modules may include MT ferrules.

In the disclosure, various terms may be used to describe the connector assembly such as plug assembly, connector module, etc. Connector module, optical fiber connector module, or simply module or assembly may be used interchangeably in the disclosure. These terms may refer to the entire structure that includes an optical fiber core, a ferrule, and other body components. In some instances, the terms may refer to subcomponents or sub-assemblies.

Figure 1A:
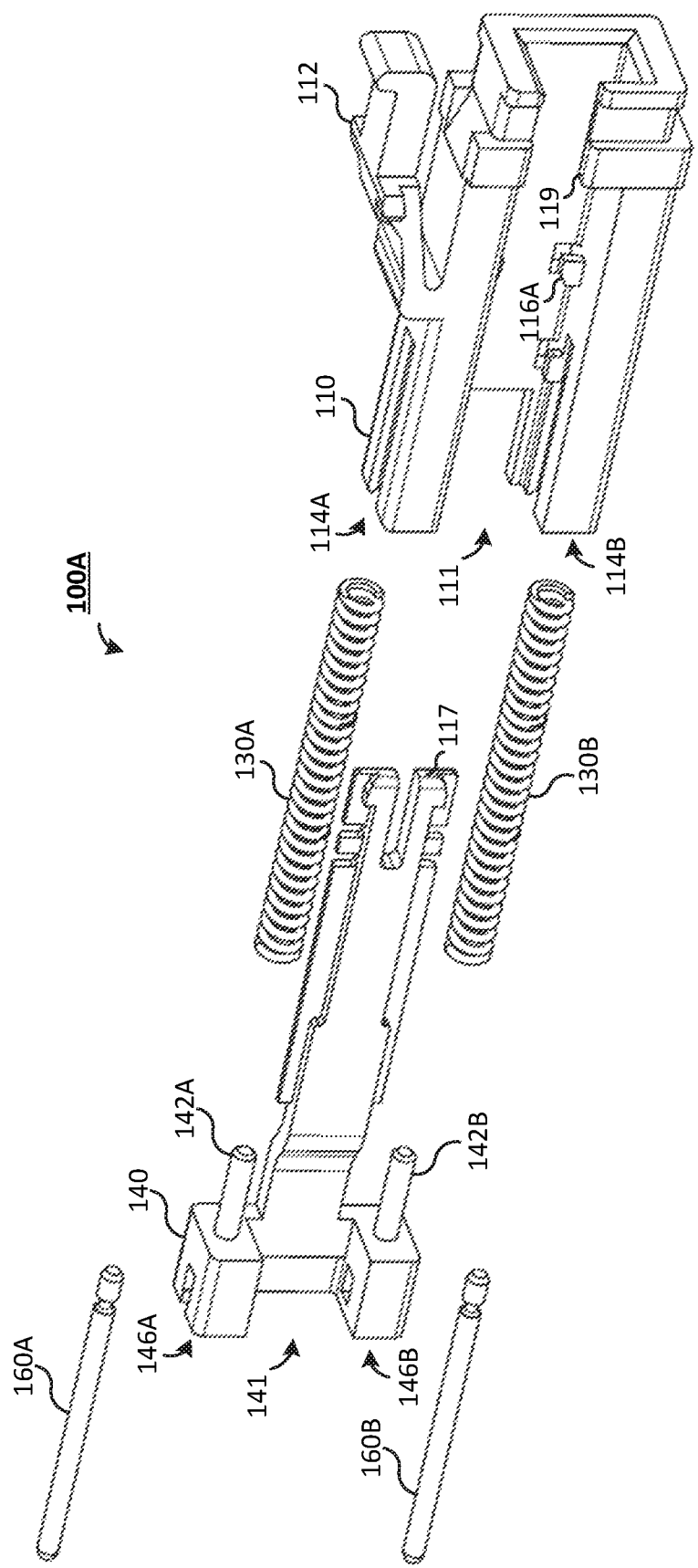
FIG. 1A is an exploded perspective view of an exemplary connector module including multiple body members, springs, and alignment pins.

FIG. 1A is an exploded perspective view of an exemplary connector module 100A including multiple body members 110, 140, springs 130A, 130B, and alignment pins 160A, 160B. The connector module 100A may include two structures that couple together to form the base of the connector module 100A. One of the structures may include a pin keeper 140, which as the name may imply holds alignment pins 160A, 160B captured at points 146A, 146B. When the module 100A is inserted into a housing, it is desirable for the fiber cores to be aligned without being skewed in the housing for good optical signal transmission. To minimize play, the holes 146A, 146B for coupling with the alignment pins 160A, 160B may have tight tolerances for holding the alignment pins 160A, 160B. In some embodiments, the pins 160A, 160B may have grooves that fit into corresponding chamfered rings or blocks (not shown) within the holes 146A, 146B The connector module 100A may include a plug assembly or body component 110 with a latching mechanism 112. To couple to the pin keeper 140, body component 110 includes coupling means such as the latch blocks 116A (upper latch block obscured) that secure the corresponding latch hook 117 from the pin keeper 140. Latch guides may also be included to help the pin keeper 140 slide into the latch block. The body component 110 may include holes or recesses 114A, 114B for capturing the springs 130A, 130B. On the corresponding areas of the pin keeper 140, there may be extension rods 142A, 142B to securely couple with the springs 130A, 130B. Springs 130A, 130B are used to provide a forward bias or force to push the front components against a housing. In the example of FIG. 1A, when the assembled connector module 100A is inserted into a housing the latch mechanism 112 braces against the latching point. In this manner, the connector module 100A is able to provide a forward bias by way of the springs 130A, 130B so that the optical fiber core is aligned and mated securely with a corresponding optical fiber core or other receiving device.

The connector module 100A is shown having an open side 111 that spans the entire length of the body component 110. The corresponding face on the pin keeper 140 may also have an open side 141 spanning the length of the pin keeper 140 such that there's a side opening spanning the length of the connector module 100A. The open side enables side installation of a terminated ferrule, with the ribbon cable being inserted into the connector module 100A on the side. One advantage of side installation may include flexibility in the process of assembling the terminated ferrule and connector module 100A. With side installation, the terminated ferrule may be inserted into an already assembled connector module (that will be more apparent in, e.g., FIGS. 2A-B). This flexibility enables the process of assembling the connector module to be independent of the process of terminating the ferrule. For example, the assembly of the connector module may be completed prior to, during, or after terminating the ferrule.

Without the side opening feature, a ribbon cable may need to pass through a connector module before being terminated to the ferrule so that it may not be possible to assemble an already terminated ferrule with an assembled connector module.

In the embodiment of FIG. 1A, the body component 110 is shown with a tab 119 or partial flange that aids in retaining the ribbon cable when the ribbon cable is inserted into connector module 100A. The tab 119 or partial flange may be designed to allow sufficient space to slip the ribbon cable into the space of the connector module 100A, e.g., by not spanning most of, or all of, the open gap.

While the embodiment shown in the FIG. 1A includes a particular configuration, one skilled in the art will recognize that other configurations are possible. For example, while the configuration shows two pins and two springs, other configurations may include one or more pins and one or more springs. As well, the alignment design, biasing element design, and latching means may vary based on system design. In some embodiments where the connector module 100A is intended for retrofitting into existing designs, the particular configuration (e.g., mating surfaces/pins, latch design, etc.) may be dictated by the existing designs.

Figure 1B:
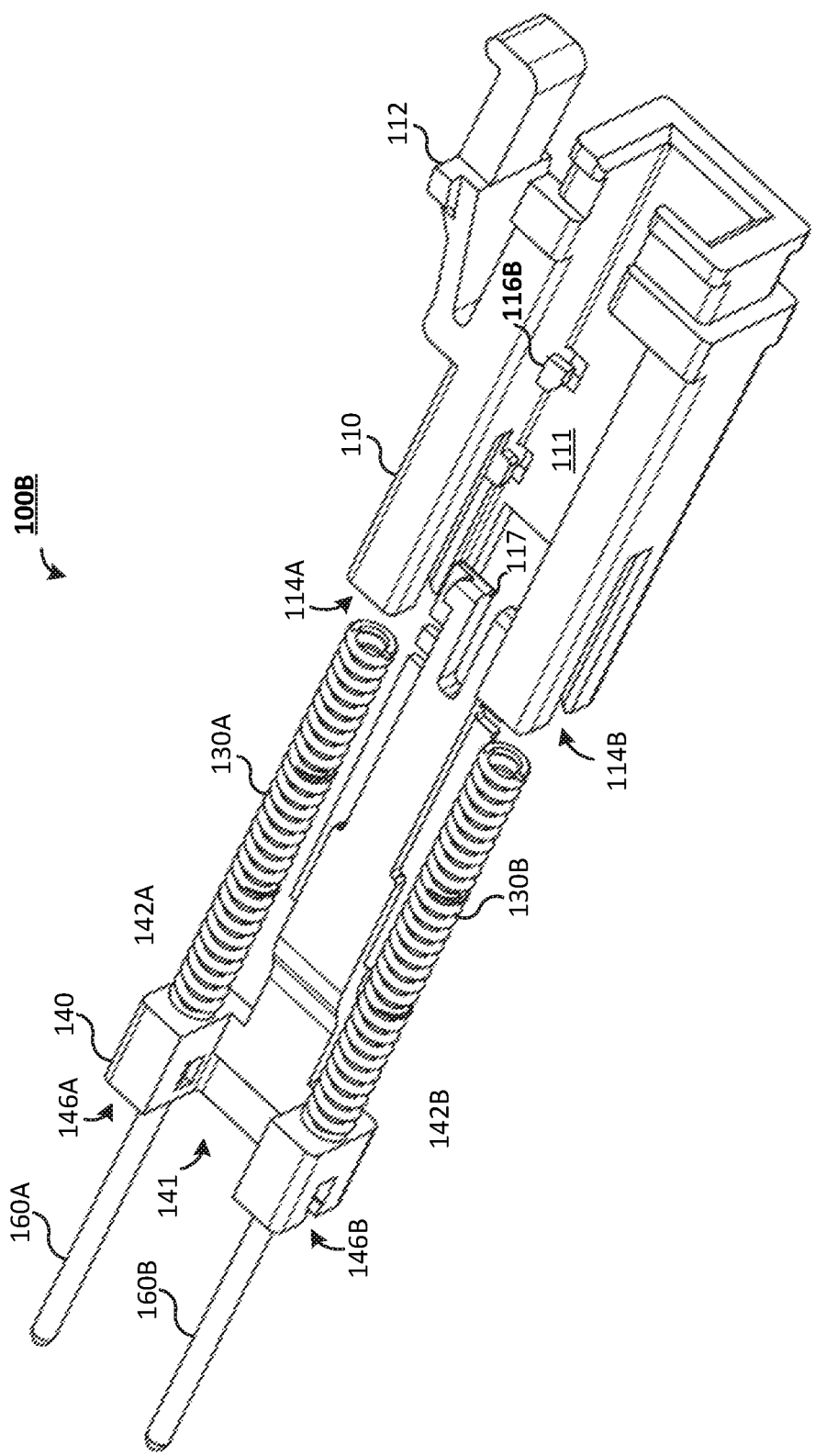
FIG. 1B is a perspective view of a partially assembled exemplary connector module, e.g., using the components of connector module 100A of FIG. 1.

FIG. 1B is a perspective view of a partially assembled exemplary connector module, e.g., using the components of connector module 100A of FIG. 1. The view of FIG. 1B shows a bottom perspective of the connector module 100B that illuminates some obscured elements in FIG. 1A such as the top latch tab 116B and top latch guide. In the example of FIG. 1B, the pins 160A, 160B have been inserted into the pin keeper 140 and the springs 130A, 130B have been fitted over the extension rods 142A, 142B (obscured by springs). FIG. 1B shows the pin keeper 140 and springs 130A, 130B in position to slide into the body component 110 to complete assembly of the connector module 100B. The latch hook 117 slides past the latch guides into the latch blocks 116A, 116B; the springs slide into the recesses 114A, 114B of the body component 110.

Figure 1C:
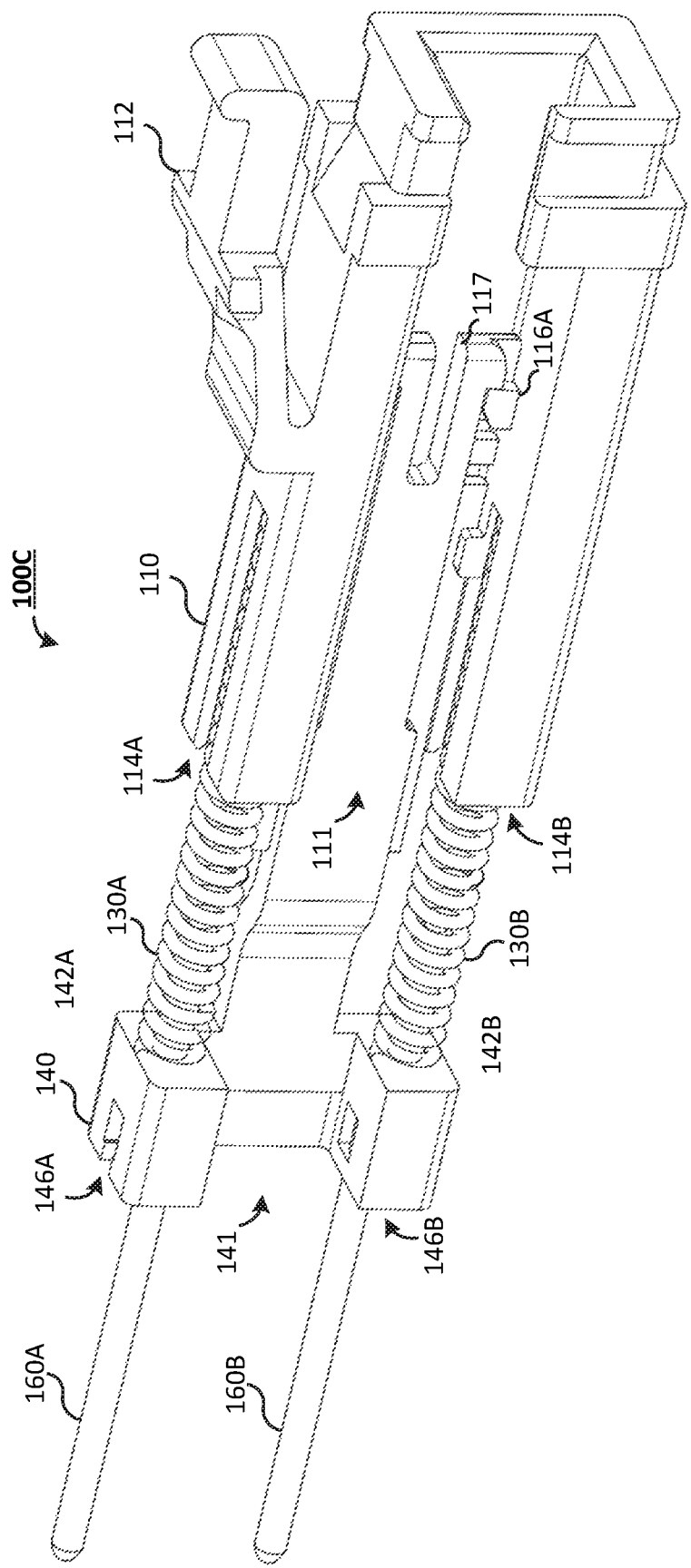
FIG. 1C is a perspective view of an assembled exemplary connector module, e.g., using the components of connector module 100A of FIG. 1.

FIG. 1C is a perspective view of an assembled exemplary connector module 100C, e.g., using the components of connector module 100A of FIG. 1. In FIG. 1B, the connector module is shown partially assembled; FIG. 1C shows the completed assembly with the springs 130A, 130B fully inserted into the recesses 114A, 114B of body component 110, and the latch hook 117 secured against the latch block 116A. As shown, the shells of the pin keeper 140 and the body component 110 do not cover the entire surface area of the connector module 100C with a substantial gap between the two components so that the springs 130A, 130B may be compressed to provide appropriate physical contact force for the ferrule as it mates to another ferrule.

The connector module 100C is assembled with the open side 141 of the pin keeper 140 and open side 111 of the body component 110 facing the same direction. With this orientation, the opening spans the length of the connector module 100C so that a terminated ferrule may be mated to the connector module 100C with the ferrule ribbon cable inserted sideways into the connector module 100C. While the embodiment shown in FIG. 1C includes a configuration with the side opening as illustrated, one skilled in the art will appreciate that the opening size, location, etc. may vary based on system design.

Figure 2A:
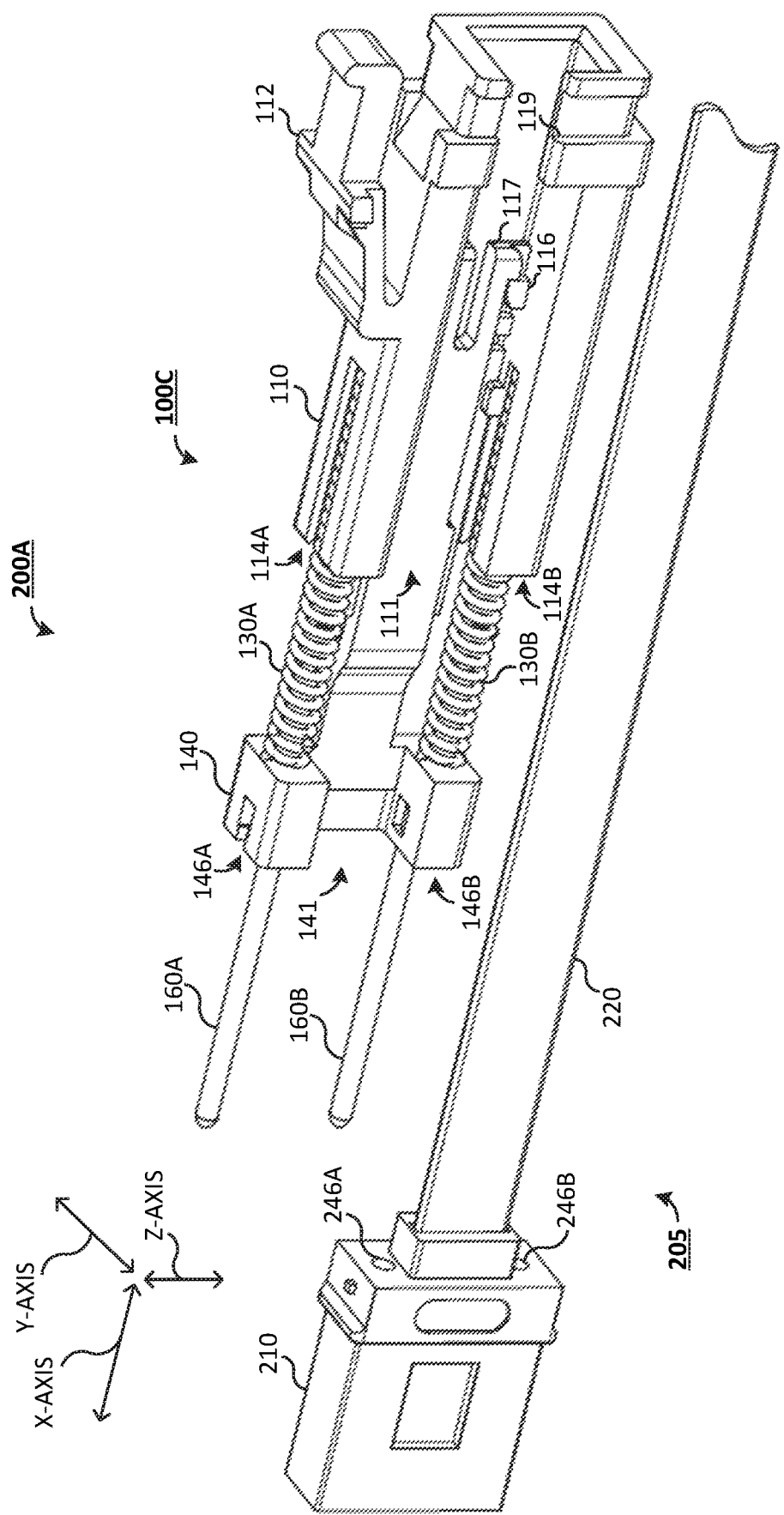
FIG. 2A is a perspective view of the assembled exemplary connector module next to a terminated ferrule.

FIG. 2A is a perspective view of the assembled exemplary connector module 100C next to a terminated ferrule 205. The terminated ferrule 205 may include the ferrule 210 and an attached ribbon cable 220 containing the optical fibers (not shown). Through-holes 246A, 246B on the ferrule are configured to slide through the alignment pins 160A, 160B.

An axis diagram with X, Y, Z axes is provided to facilitate discussion regarding mating the connector module 100C with the terminated ferrule 205. In the example of FIG. 2A, the side opening on the connector module 100C is along the X-axis. The terminated ferrule 205 with the ribbon cable 220 is similarly aligned along the same X-axis. To mate the terminated ferrule 205 with the connector module 100C the alignments pins 160A, 160B may be lined up with the through-holes 246A, 246B on the ferrule 210, and the ribbon cable 220 is deposited into the inside cavity of the connector module 100C. As illustrated the gap at tab 119 may be smaller than the width of the ribbon cable 220 (width in the Z-axis) so that the ribbon cable 220 may need to be rotated or tilted to be inserted into the connector module. Because the ribbon cable 220 may be semi-rigid it may be preferable to first insert the ribbon cable 220 before sliding the ferrule 210 into the alignment pins 160A, 160B.

Figure 2B:
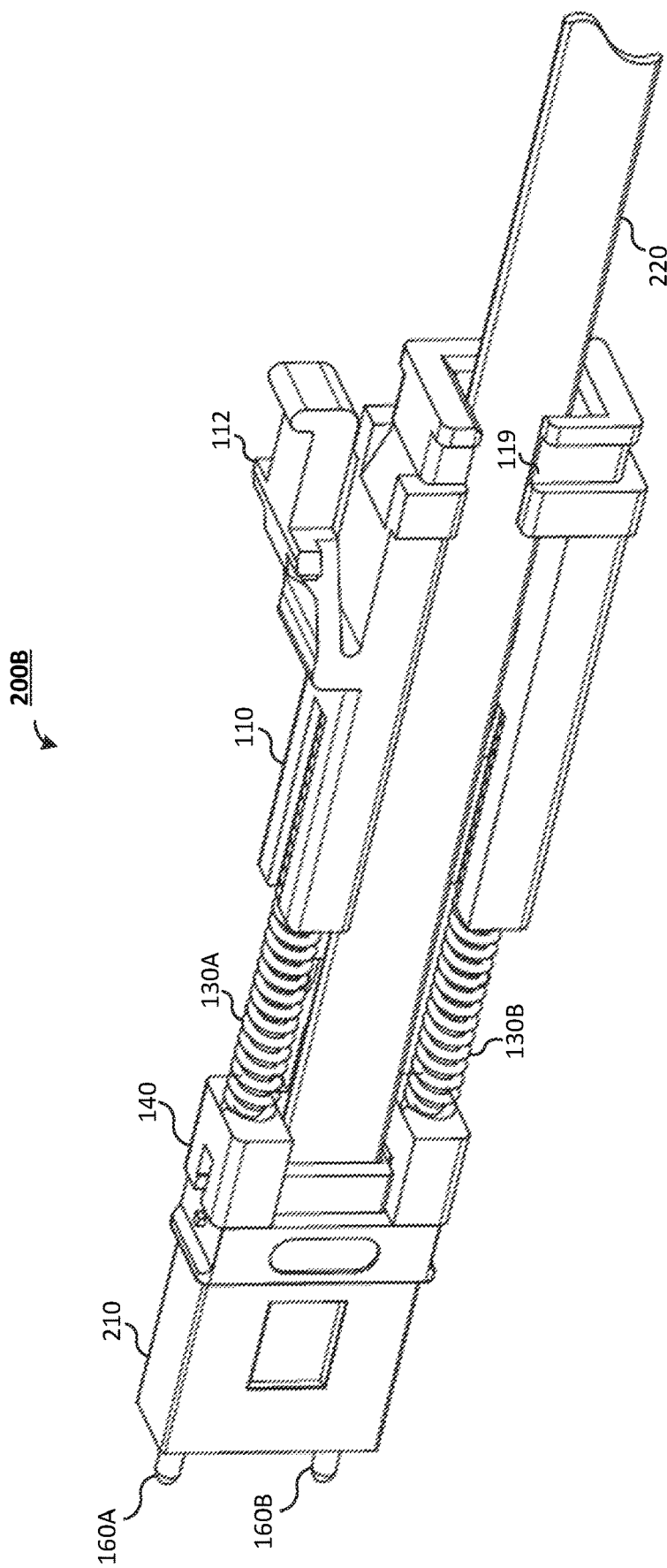
FIG. 2B is a perspective view of the assembled exemplary connector module mated to the terminated ferrule.

FIG. 2B is a perspective view of the assembled exemplary connector module mated to the terminated ferrule. When the entire assembly 200B is mated, the pins 160A, 160B protrude through the ferrule 210 to align with a housing that receives the entire assembly 200B. As shown, the gap at the opening near tab 119 is smaller than the width of the ribbon cable 220 so that the ribbon cable 220 is retained within the inside space of the connector module and does not accidentally slip outside.

The springs 130A, 130B are located on the same plane (z-plane) as the ribbon cable 220 and may occupy space otherwise available for the ribbon cable 220. In other embodiments, the springs may be re-located (e.g., off-axis) or reduced in size to provide more space for wider ribbon cables. Another embodiment is provided starting in FIG. 3A that may accommodate a wider ribbon cable.

FIGS. 3A-B are perspective views of another exemplary connector module 300 including a body member 310 and spring 320. The pin keeper (not shown) will be described below with reference to FIG. 4A. FIG. 3A shows a side perspective view, and FIG. 3B shows a bottom perspective view illustrating the gap 330 at the bottom for insertion of a ribbon cable. The embodiment of FIG. 3A may accommodate a wider ribbon cable because the ribbon cable is inserted within the interior of the spring 320 itself so that the size of the spring doesn't occupy the space. FIG. 3C shows the spring 320 may be designed with a "U" or "C" shape (when viewing the spring from the front in the direction of 390) including an opening 324 for the ribbon cable to slide into the interior space 326. The spring may also be referred to as a wire-binding type spring. To provide the opening 324, the spring is not wound in a spiral like a typical spring, but rather follows an example pattern as illustrated in FIGS. 3A-B. The spring pattern may include curved lips 322A, 322B to help retain the ribbon cable deposited within the space 326 of the spring 320. The spring 320 may provide a forward bias or force for ensuring a stable connection of the optical fibers.

The body component 310 of the connector module 300 may include an area to secure the spring 320 with a retaining block 314 or chamfered block. There may be one or more retaining blocks 314 of various sizes for the spring 320. A latching mechanism 312 towards the rear of the connector module 300 secures the connector module 300 when plugged into a housing.

Figure 4A:
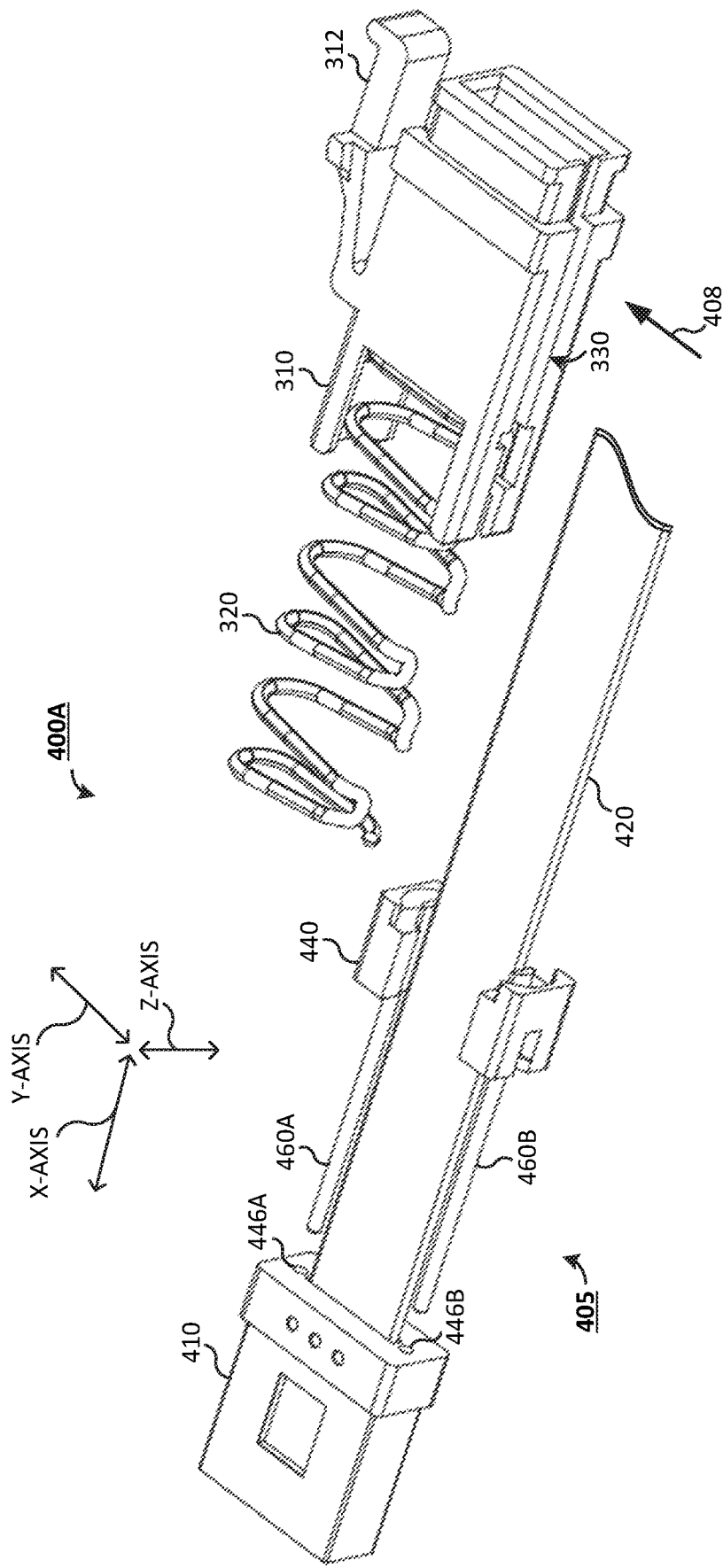
FIG. 4A is a perspective view of the assembled exemplary connector module of FIG. 3A next to a terminated ferrule within another body member of the exemplary connector module.

FIG. 4A is a perspective view of the exemplary connector module, e.g., of FIG. 3A, next to a terminated ferrule 405. FIG. 4A shows the pin keeper 440 of the connector module in position prior to sliding into the through-holes 446A, 446B of the ferrule 410. In the embodiment of FIG. 4A, the ribbon cable 420 may be wider (e.g., than the ribbon cable 220 shown in FIG. 2A) holding more optical fiber cores. To accommodate the wider ribbon cable 420, some of the components may be configured to provide the extra space occupied by the ribbon cable 420. For example, the inside areas of pin keeper 440 may farther apart, the configuration may use smaller pins 460A, 460B, and use smaller through-holes 446A, 446B on the ferrule 410. One skilled in the art will recognize that the configuration may change based on the desired design including the ribbon cable characteristics.

In the example of FIG. 4A, the terminated ferrule 405 and pin keeper 440 are in position for mating to the rest of the connector module with the spring 320 and body component 310. The alignment pins 460A, 460B of the pin keeper are lined up with the ferrule 410; the ribbon cable 420 is placed in an orientation for inserting into the connector module body 310 in the direction of 408 through the open gap 330. When the pin keeper 440 is mated to the body component 310, the spring 320 may be inserted into retaining blocks or chamfered blocks (now shown) on the pin keeper 440.

Figure 4B:
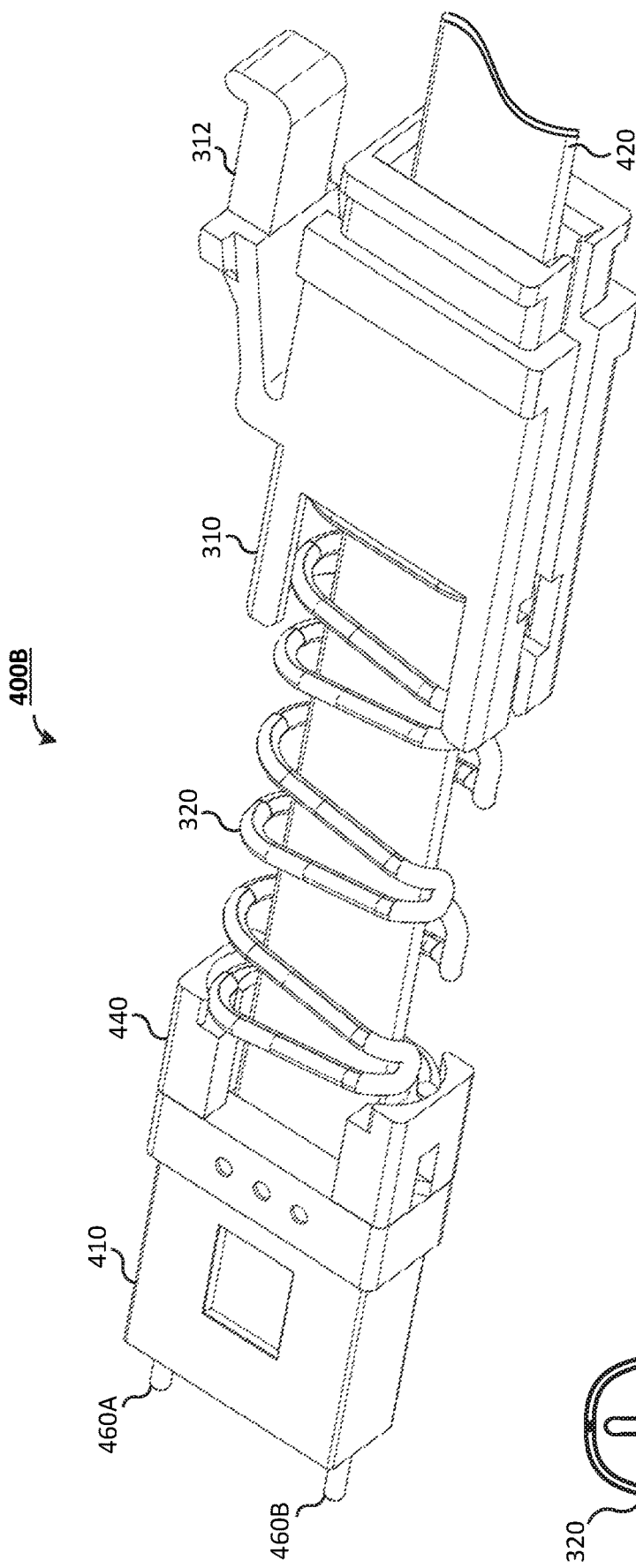
FIG. 4B is a perspective view of the assembled exemplary connector module of FIG. 3A mated to the terminated ferrule.
Figure 4C:
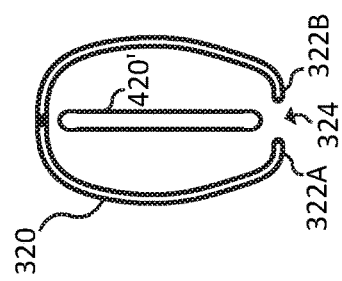
FIG. 4C is a diagram illustrating a perspective of the spring of FIG. 3A when viewed from the front with a cross-section view of the ribbon cable deposited within the spring.

FIG. 4B is a perspective view of the assembled exemplary connector module 400B, e.g., corresponding to the partially assembled connector module 400A of FIG. 4A. In this view, all components have been assembled together. The alignment pins 460A, 460B are shown protruding from the ferrule 410 after being inserted past the through-holes of the ferrule 410. The spring 320 is braced between the pin keeper 440 and body component 310, secured in the retainer blocks on the two components. As shown, the shells of the pin keeper 440 and the body component 310 do not cover the entire surface area of the connector module 400B with a substantial gap between the two components so that the spring 320 may be compressed to provide appropriate physical contact force for the ferrule as it mates to another ferrule. The ribbon cable 420 is inserted into the space within the spring 320, as illustrated in FIG. 4C, showing a front view of the spring 320 along with a cross-section view of the ribbon cable 420' after it has been deposited within the spring 320.

Figure 5B:
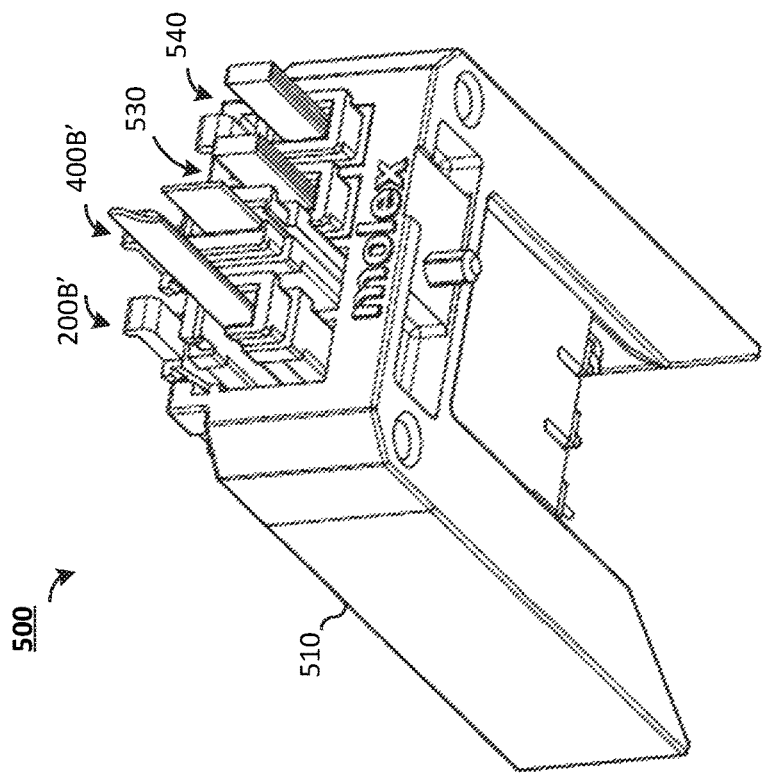
FIGS. 5A-C are perspective views of the mated connectors latched into a housing, with FIG. 5A showing a top perspective view, FIG. 5B showing a bottom perspective view, and FIG. 5C showing a side perspective view.
Figure 5A:
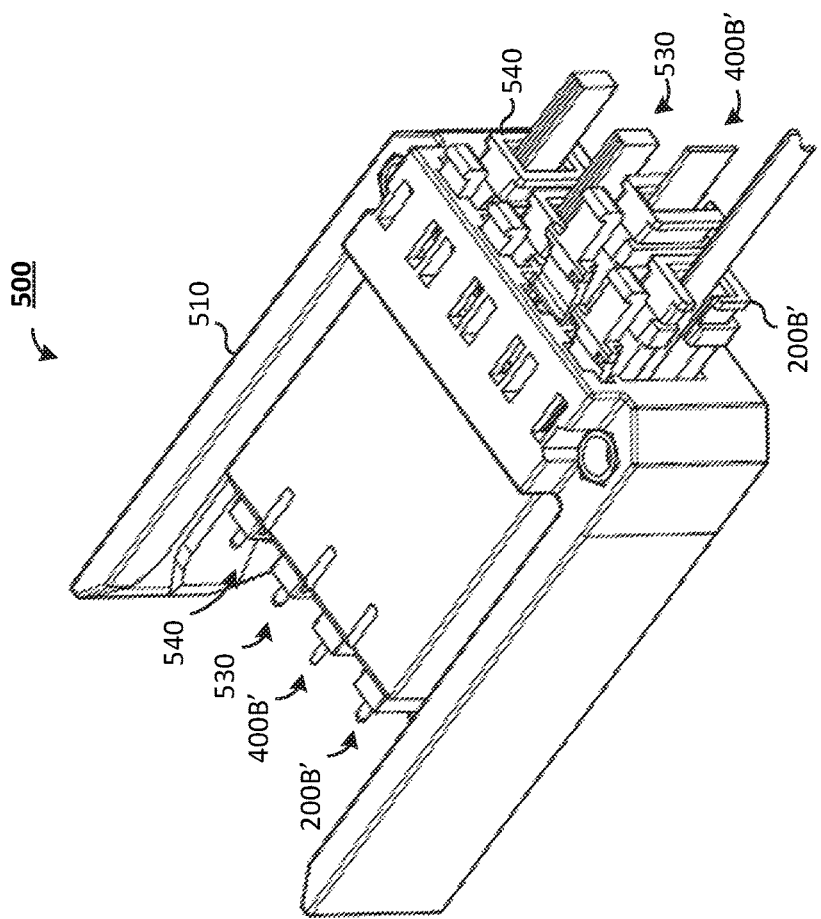
Figure 5C:
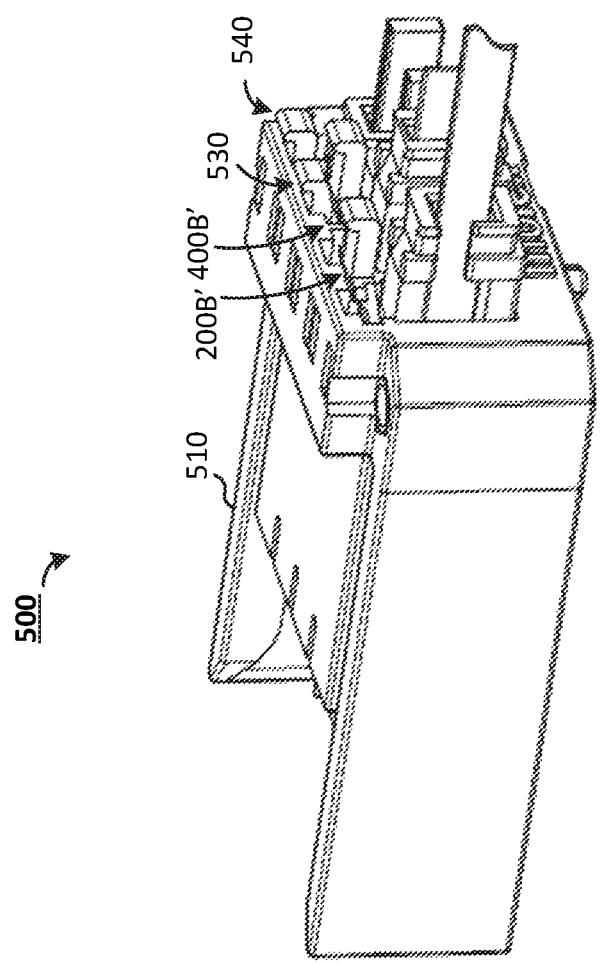

FIGS. 5A-C are perspective views of a configuration 500 with the connector modules latched into a housing 510, with FIG. 5A showing a top perspective view, FIG. 5B showing a bottom perspective view, and FIG. 5C showing a side perspective view of the configuration 500. The configuration 500 shows a housing 510 with four ports. The connector modules may be the modules 200A of FIG. 2A, 400B of FIG. 4B, with modules of other designs 530, 540 (e.g., pre-existing designs). The front end of each connector module passes through the housing to enable a signal connection to corresponding connector modules (now shown).

Figure 6:
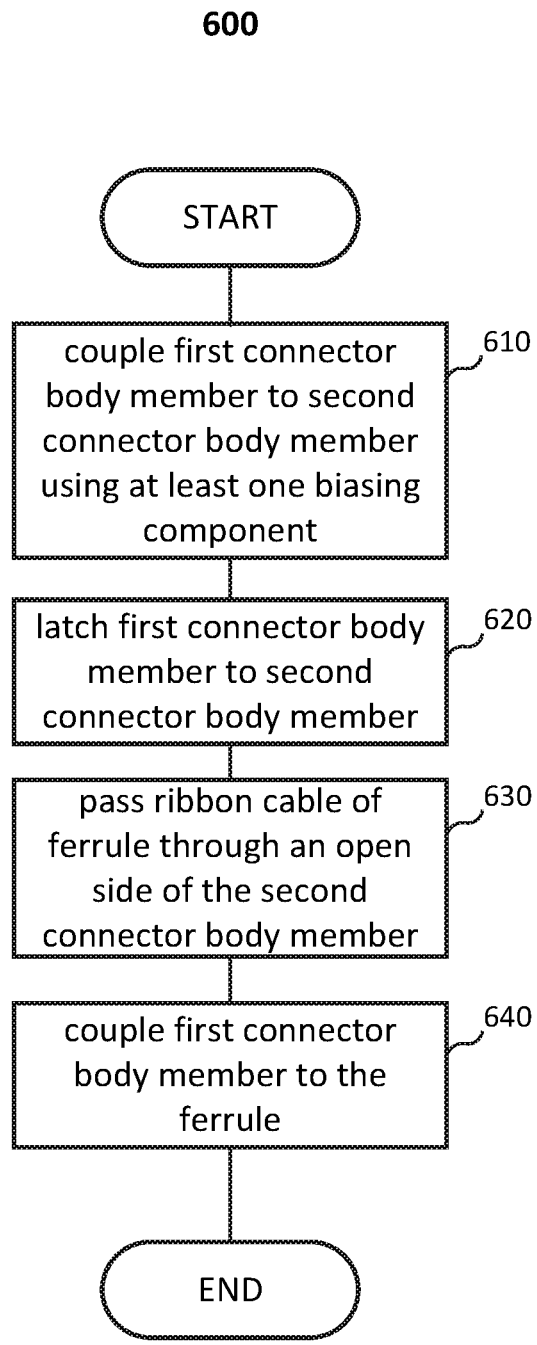
FIG. 6 is a flow chart illustrating an exemplary method for assembling a connector module.

FIG. 6 is a flow chart illustrating an exemplary method 600 for assembling a connector module. For example, the method may illustrate the steps for assembling the configuration 100A of FIG. 1A, with the various stages of the configurations in FIGS. 1B-C and FIGS. 2A-B.

At step 610, the method may include coupling a first connector body member to a second connector body member using at least one biasing component. The at least one biasing component may be springs or other suitable devices.

At step 620, the method may include latching the first connector body member to the second connector body member. For example, the first connector body member may include latch hooks and the second connector body member may include latch blocks to enable the two parts to latch together. In other embodiments, other suitable latching means may be used, or means other than latches may be used to couple the components. At step 630, the method may include passing the ribbon cable through an open side of the second connector body member. At step 640, the method may include coupling the first connector body member to the ferrule, e.g., using an alignment component such as the alignment pins.

The method may include depositing the alignment components in cavities of the first connector body member, where coupling the first connector body member to the ferrule includes inserting the alignment components through holes of the ferrule. The method may include depositing the biasing components in cavities of the second connector body member and mating the biasing components to the first connector body member at extension sections (e.g., extension rods).

Figure 7:
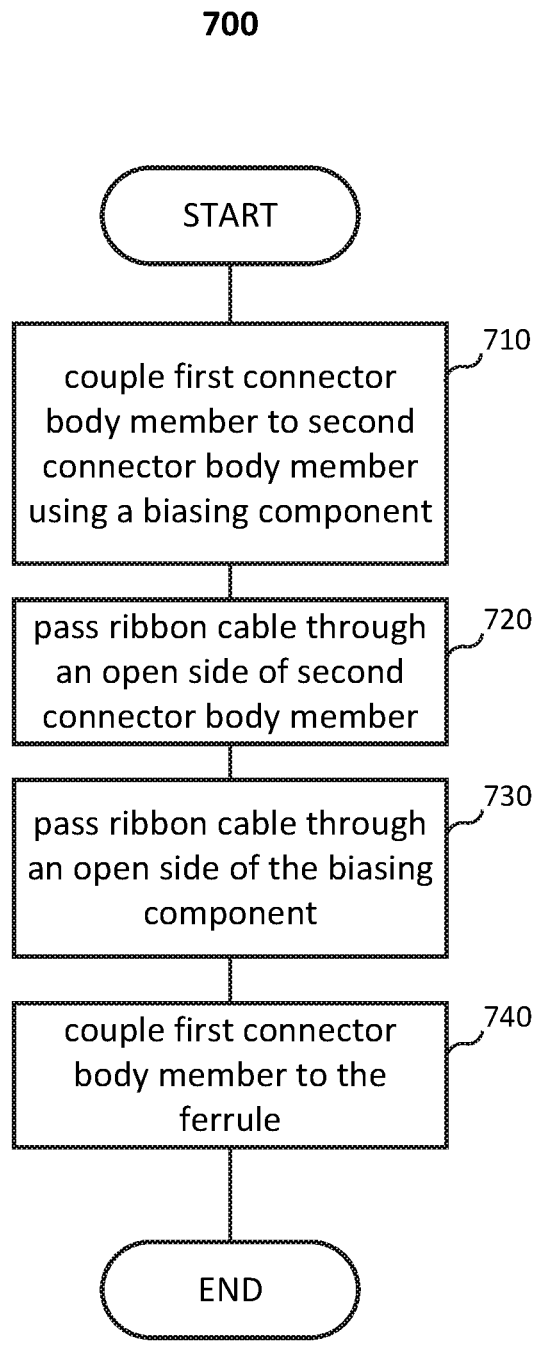
FIG. 7 is a flow chart illustrating another exemplary method for assembling a connector module.

FIG. 7 is a flow chart illustrating another exemplary method 700 for assembling a connector module. For example, the method may illustrate the steps for assembling the configuration 400A of connector module components of FIG. 4A, with the various stages of the configurations in FIGS. 4B-C.

At step 710, the method may include coupling a first connector body member to a second connector body member using a biasing component. The biasing component may be a spring or other suitable device. For example, the spring may be the C or U-shaped spring 320 shown in FIG. 4A.

At step 720, the method may include passing the ribbon cable of the ferrule through an open side of the second connector body member into a through-channel of the second connector body member. At step 730, the method may include passing the ribbon cable of the ferrule through an open side of a biasing component into the interior of the biasing component. At step 740, the method may include coupling, using at least one alignment component, the first connector body member to the ferrule.

The method may include depositing alignment components in cavities of the first connector body member, where coupling the first connector body member to the ferrule includes inserting the alignment components through holes of the ferrule. The method may include securing the biasing component in a first tab of first connector body member. The method may include securing the biasing component in a second tab of second connector body member.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. An optical fiber connector module for coupling to a ferrule terminated to at least one fiber in a ribbon cable, the optical fiber connector module comprising:
   a biasing component having a structure with an open side for side insertion of the ribbon cable;
   a first connector body member for coupling to the ferrule, the first connector body member comprising:
     at least one alignment component coupling section,
     a biasing component coupling section, and
     a first through-channel for the ribbon cable; and
   a second connector body member coupled to the first connector body member, the second connector body member comprising:
     a biasing component coupling section,
     a second through-channel for the ribbon cable, and
     a second open side spanning the length of the second connector body member providing access to the second through-channel for the ribbon cable.

2. The optical fiber connector module of claim 1, wherein the second open side of the second connector body member is aligned with the open side of the biasing component such that the ribbon cable can be inserted sideways through the second connector body member into the space within the biasing component.

3. The optical fiber connector module of claim 1, wherein the second connector body member further comprises a graspable latching mechanism for securing the optical fiber connector module within a connector module housing.

4. The optical fiber connector module of claim 1, wherein the second connector body member is configured for coupling to a connector module housing without enclosing or covering the second open side.

5. The optical fiber connector module of claim 1, further comprising at least two alignment components, wherein the first connector body member comprises at least two alignment component coupling sections consisting of cavities for insertion of the least two alignment components.

6. The optical fiber connector module of claim 5, wherein the least two alignment components pass through channels in the ferrule when the first connector body member is coupled to the ferrule.

7. The optical fiber connector module of claim 1, wherein the biasing component has a substantially "C" or "U" shape structured to enclose the ribbon cable when the ribbon cable is inserted.

8. The optical fiber connector module of claim 1, wherein the biasing component coupling section of the first connector body member comprises a tab or chamfered block for retention of the biasing component, and the biasing component coupling section of the second connector body member comprises a second tab or second chamfered block for retention of the biasing component.

* * * * *